(12) United States Patent
Serna

(10) Patent No.: US 11,948,175 B2
(45) Date of Patent: Apr. 2, 2024

(54) CUSTOMER SENTIMENT-DRIVEN, MULTI-LEVEL, PROXIMITY RESPONDER

(71) Applicant: Bank of America Corporation, Charlotte, NC (US)

(72) Inventor: Daniel J. Serna, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 912 days.

(21) Appl. No.: 16/868,716

(22) Filed: May 7, 2020

(65) Prior Publication Data

US 2021/0350422 A1 Nov. 11, 2021

(51) Int. Cl.
*G06Q 30/02* (2023.01)
*G06Q 10/04* (2023.01)
*G06V 40/00* (2022.01)
*G06V 40/16* (2022.01)

(52) U.S. Cl.
CPC ......... *G06Q 30/0281* (2013.01); *G06Q 10/04* (2013.01); *G06V 40/174* (2022.01); *G06V 40/00* (2022.01)

(58) Field of Classification Search
None
See application file for complete search history.

(56) References Cited

U.S. PATENT DOCUMENTS

| 1,026,199 | A | 5/1912 | Bullard |
| 9,282,070 | B2 | 3/2016 | Haugen et al. |
| 9,471,883 | B2 | 10/2016 | Chatterjee et al. |
| 9,699,307 | B2 | 7/2017 | Conway et al. |
| 10,007,661 | B2 | 6/2018 | Arquero et al. |
| 10,031,909 | B2 | 7/2018 | Blaschak et al. |
| 10,050,926 | B2 | 8/2018 | Ebersman et al. |
| 10,353,898 | B2 | 7/2019 | Kawecki, III |
| 10,484,540 | B2 | 11/2019 | Fang et al. |

(Continued)

OTHER PUBLICATIONS

Frost, Adam, "Zensors launches AI-powered 3D vehicle tracking system using existing cameras," [online] Traffic Technology Today, published on Jun. 21, 2019. Available at: < https://www.traffictechnologytoday.com/news/cloud-computing/zensors-launches-ai-powered-3d-vehicle-tracking-system-using (Year: 2019).*

*Primary Examiner* — Richard W. Crandall
(74) *Attorney, Agent, or Firm* — Weiss & Arons LLP

(57) ABSTRACT

A system for determining a likelihood that a pre-determined customer will enter a selected customer support center (CSC) is provided. The system includes a customer-tracking system for determining whether the customer is within a predetermined distance of the CSC. The tracking system is set to a tracking state in response to receiving a customer tracking opt-in selection. The system also includes a biometric monitoring system that monitors, using an electronic device in close proximity to the customer, when the customer is determined to be within the pre-determined distance of the CSC. The biometric monitoring system monitors the customer's biometric functions to determine the likelihood of the customer entering the CSC. When a determination of the likelihood of the customer physically entering the CSC is higher than a threshold level, the system may provide the likelihood, as further influenced by the customer sentiment condition, of the customer entering the CSC.

12 Claims, 7 Drawing Sheets

(56) References Cited

U.S. PATENT DOCUMENTS

| | | | |
|---|---|---|---|
| 2002/0143623 A1* | 10/2002 | Dayley | G06Q 30/0269 705/14.27 |
| 2012/0330722 A1* | 12/2012 | Volpe | G06Q 30/0207 705/7.29 |
| 2013/0218677 A1* | 8/2013 | Yopp | G06Q 30/02 705/14.66 |
| 2014/0337257 A1 | 11/2014 | Chatterjee et al. | |
| 2015/0026010 A1* | 1/2015 | Ellison | G06Q 30/0641 705/26.41 |
| 2016/0003492 A1 | 1/2016 | Klein et al. | |
| 2016/0034902 A1* | 2/2016 | Bernstein | G06Q 30/01 705/7.34 |
| 2017/0053330 A1* | 2/2017 | Smith | G06Q 30/0613 |
| 2017/0185921 A1 | 6/2017 | Zhang | |
| 2017/0270099 A1 | 9/2017 | Gorny | |
| 2017/0311125 A1* | 10/2017 | Hedley | G01S 5/0289 |
| 2018/0089171 A1 | 3/2018 | Arquero et al. | |
| 2018/0337602 A1* | 11/2018 | Zhou | H02M 1/36 |
| 2020/0089939 A1* | 3/2020 | Rodriguez Bravo | H04L 67/10 |
| 2021/0004606 A1* | 1/2021 | Se | G01S 5/0264 |
| 2021/0042507 A1* | 2/2021 | Raviv | G06V 40/165 |

\* cited by examiner

Customer Support Center Screen

802

1) Mr. Jones will be Entering the CSE on a Matter of Moments

2) Please have his File Ready

3) He has been Instructed that he will meet Mr. Smith

4) Please Note that Mr. Jones has an Elevated Pulse Rate and may be Agitated

FIG. 8

CUSTOMER SENTIMENT-DRIVEN, MULTI-LEVEL, PROXIMITY RESPONDER

FIELD OF TECHNOLOGY

This disclosure relates to forecasting future customer behavior.

BACKGROUND OF THE DISCLOSURE

The disclosure is directed to determining the likelihood of a pre-determined customer entering a customer support center (CSC). In order to efficiently prepare for the customer's arrival and to efficiently respond to the customer's needs, it is important to adequately determine the likelihood of the customer entering the CSC. Determination of such a likelihood can allow an entity or institutions associated with the CSC to adjust utilization of its resources based on whether the customer is not likely, likely, or very likely to arrive in person in the CSC.

For example, being prepared for an irate customer who is predicted to arrive within a known time-frame can enable the CSC to reduce negative fallout from an unexpected arrival of such a customer. It can also prevent unwanted reputational harm to the institution or entity associated with the CSC.

Conversely, a contented customer with a simple question may be directed to an area of the CSC that is automated or otherwise low-resource consumptive. As such, it may be desirable to provide systems and methods that accurately predict the arrival of the customer to the CSC so that CSC may reduce expenditure of resources.

In addition, public-facing industries incorporate trust as part of their value-add. Thus, appropriately handling unexpected, in-person, arrivals can often positively impact on the reputational health of public-facing institutions.

To the contrary, however, directing resources toward an arrival of a customer (who may or may not actually arrive) may waste valuable resources, and may divert such resources from customers currently in the CSC—thereby reducing resource efficiency.

Accordingly, it would be desirable to provide systems and methods that increase the accuracy of predicting the arrival of a customer in a CSC.

It would be further desirable to provide systems and methods that not only accurately predict the arrival of a customer at a CSC, but provide analysis of, and possibly instructions for, the predicted state of the customer upon his or her arrival.

SUMMARY OF THE DISCLOSURE

Methods for determining a likelihood that a pre-determined customer will enter a selected customer support center (CSC) are provided. An aspect of the methods set forth herein includes determining whether the customer is within a predetermined distance of the CSC.

When the customer is determined to be within the predetermined distance of the CSC, the method may include initiating monitoring of a plurality of the customer's biometric functions using an electronic device within a pre-determined proximity of the customer.

The biometric functions taken alone can be mapped against historical biometric functions to determine the likelihood of the customer entering the CSC. The biometric functions taken in combination with the proximity and/or determinations of the customer may help to refine the conclusions of the proximity determination regarding the likelihood of the customer entering the CSC.

The methods may further include tuning the determination of the likelihood of the customer entering the CSC by retrieving and reviewing a customer sentiment condition.

The methods may also include dynamically updating, either periodically or continually, the likelihood determination.

As described above, the method may include, at some predetermined point during the method, providing to the CSC a likelihood of the customer physically entering the CSC. The providing of the likelihood of the customer physically entering the CSC may occur in response to the customer entering a pre-determined proximity of the CSC.

Alternatively, the providing of the likelihood of the customer physically entering the CSC may occur when a tuned determination of the likelihood of the customer physically entering the customer support center is higher than a first predetermined proximity threshold level.

The method may further include electronically transmitting instructions to the device when the tuned determination of the likelihood of the customer physically entering the CSC is higher than a second predetermined proximity threshold level.

Alternatively, electronically transmitting instructions to the device may occur in response to the customer entering a second predetermined proximity threshold level of the CSC. Such instructions may preferably instruct the customer on actions to be taken upon the customer's entrance to the CSC.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows an exemplary screenshot taken from a device associated with a Customer Support Center (CSC) in accordance with the disclosure.

DETAILED DESCRIPTION OF THE DISCLOSURE

Figure 1:
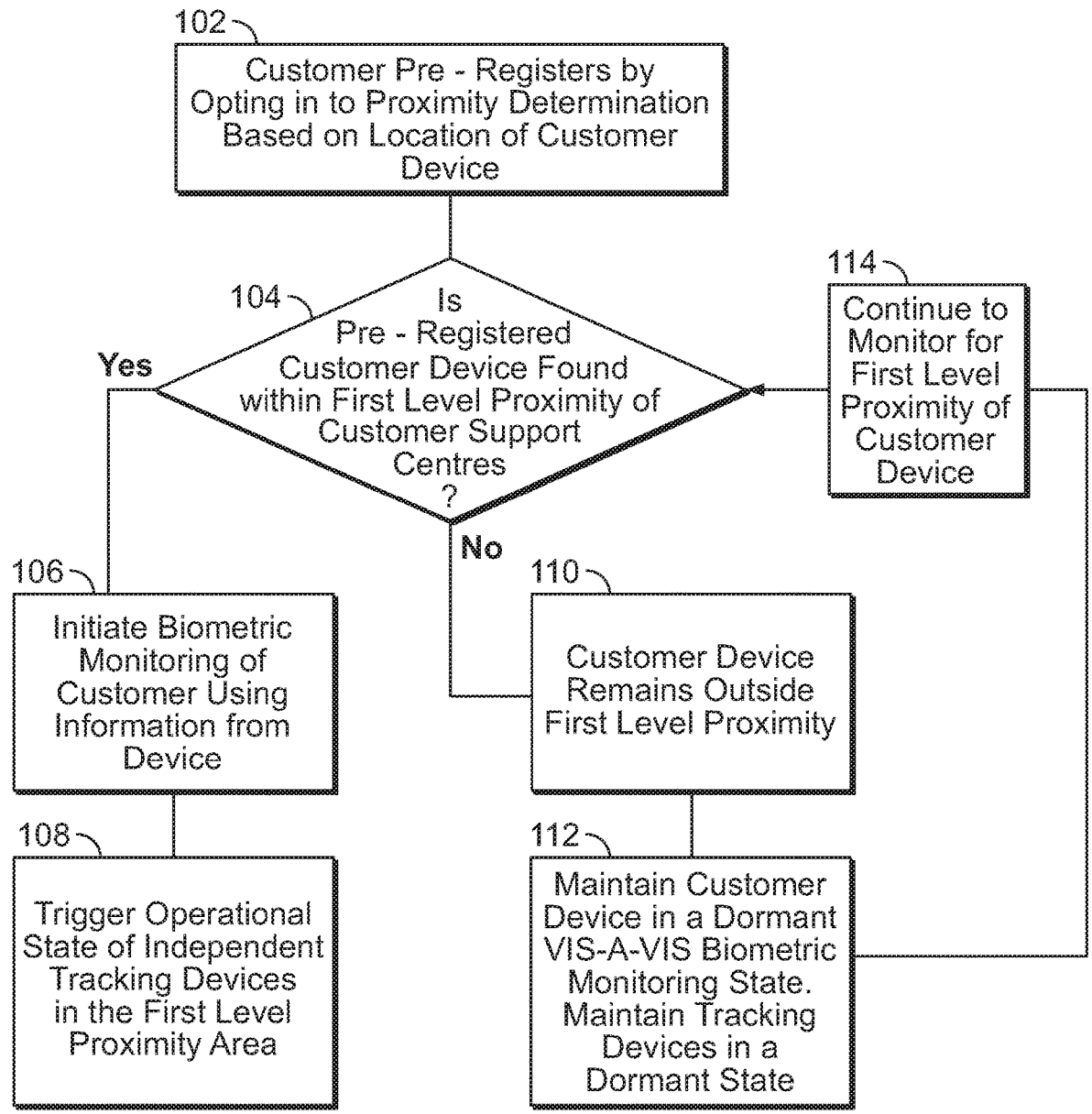
FIG. 1 shows an illustrative flow diagram of a method that determines a likelihood that a pre-determined customer will enter a selected customer support center.

The Summary of the Disclosure set forth above describes certain methods according to the subject matter of the disclosure.

The methods according to the disclosure may also include such processes whereby the plurality of biometric functions detected by the customer device include mouth movements and facial complexion. In some embodiments, the plurality of biometric functions may include body heat detection. The heat detection may identify a customer level of tension and/or a customer level of calmness.

In certain embodiments, the retrieving and reviewing the customer sentiment condition may include retrieving and reviewing a plurality of historical customer sentiment profiles and comparing the customer sentiment condition to the plurality of historical customer sentiment profiles. In some embodiments, the method may further include adjusting the instructions based on the comparing.

It should be noted that, in addition to customer sentiment condition information, machine learning (ML) may also be used for evaluating the possibility of a pre-determined customer entering a customer support center (CSC), as well as the customer sentiment condition upon his or her predicted entry. As such, past customer behavior may be leveraged to further refine and tune the prediction of the likelihood of the customer entering a CSC, as well as the customer sentiment condition upon his or her predicted entry.

In some embodiments, the retrieving and reviewing the customer sentiment condition may include retrieving and reviewing a plurality of artifacts from social media account history and/or other third party data source information associated with the device and/or associated with the customer. In certain embodiments, the method may further include comparing the plurality of artifacts to the previously retrieved historical sentiment profiles, and, based on the comparing, adjusting the instructions.

The CSC may be configured to forecast the likely customer emotional, psychological and/or physical state of the customer upon his or her predicted entry into the CSC. Based on the forecast, the method may be configured to adjust the instructions.

Accordingly, in some embodiments of the invention, methods may include providing detailed information of the likelihood of a predicted customer arrival at a pre-determined CSC, the predicted time of arrival and an expected emotion/psychological and/or physical state of the customer upon arrival. Moreover, this information is preferably based on a historical context of past customer behavior. Furthermore, the methods provide information on advantageous responses to the current customer condition being provided to the CSC. Alternatively, or in combination with some or all of the foregoing, the methods provide instructions to/for the customer regarding actions to be taken upon arrival at the CSC.

In some embodiments, methods may further include receiving a pre-registration from the device prior to retrieving and reviewing the customer sentiment condition.

In certain embodiments, the methods may include receiving a pre-registration from the device that includes an opt-in from the pre-determined customer for customer tracking.

FIG. 1 shows an illustrative flow diagram that determines a likelihood that a pre-determined customer will enter a selected CSC. As a first step 102 in the process shown in FIG. 1, a customer may pre-register by opting in to a method that implements a customer proximity determination based on location of a customer device.

A query is shown at 104. Query step 104 shows that if the pre-registered customer device is found within a first level proximity of CSCs, then the process continues to step 106—initiating biometric, or other suitable, monitoring of the customer device or the customer using information from the device. It is important to note that, in certain embodiments, even if the device is not currently fully activated by the user, the device may be placed in a setting such that it can obtain and transmit certain biometric information such as, for example, gait, breaths per minute, heartbeats per minute, speed of travel, etc.

Also, detection of the pre-registered customer device within the first level proximity of a CSC may cause certain independent tracking devices within the first level proximity area to enter an operational state, as shown at step 108.

Query step 104 also shows that if the pre-registered customer device is not found within a first level proximity of customer support centers, then the process continues to step 110, which shows a determination that the customer device remains outside the first level proximity. Such a finding may preclude the short-term entry of the customer into the CSC.

The process then, at step 112, maintains the customer device in a dormant state vis-à-vis the biometric monitoring. The process will, at step 114, continue to monitor for first level proximity of the customer device.

Figure 2:
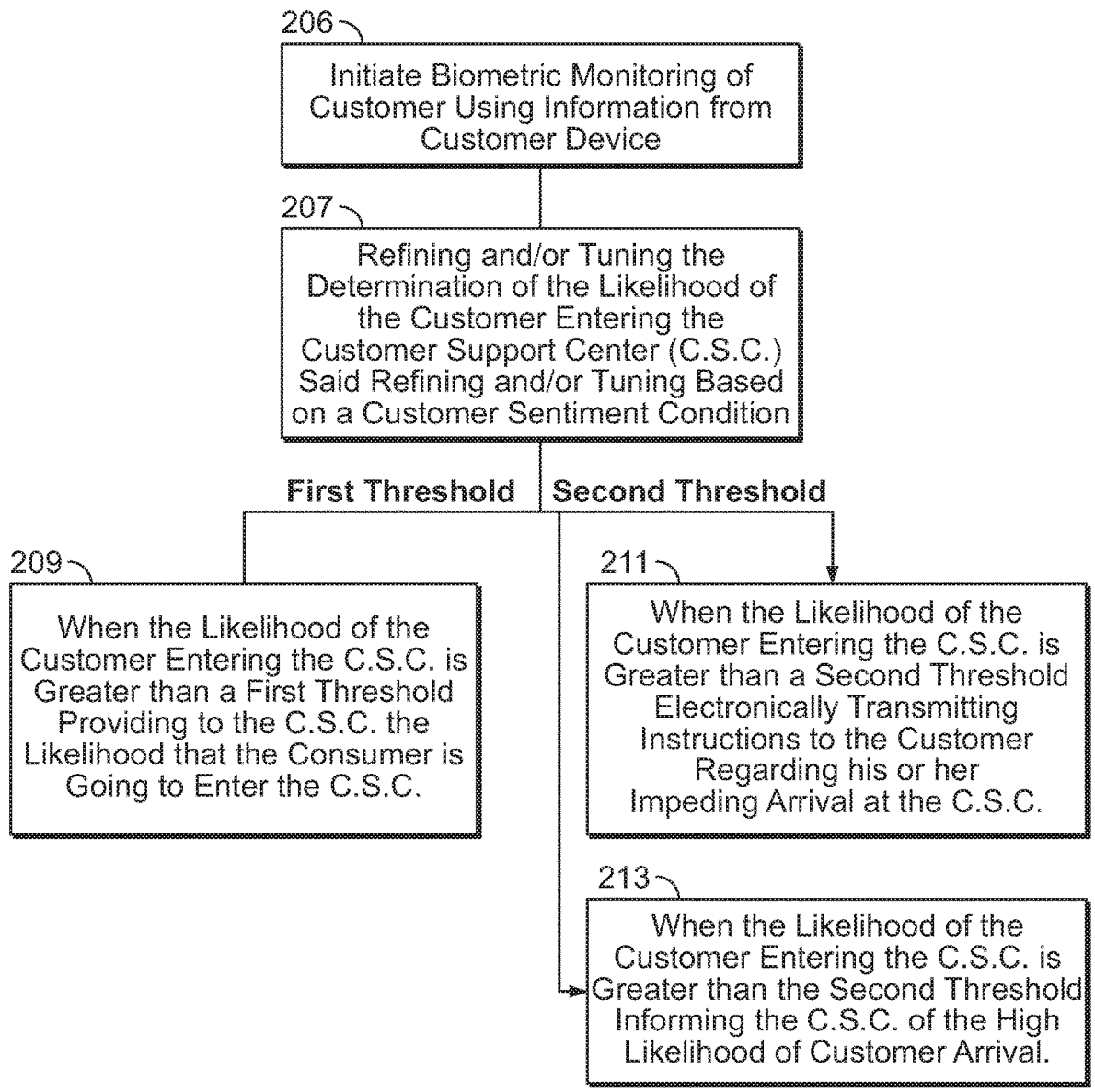
FIG. 2 shows an illustrative flow diagram in accordance with principles of the disclosure.

FIG. 2 shows an illustrative flow diagram in accordance with principles of the disclosure. At step 206 FIG. 2 shows initiating biometric monitoring of the customer using information received from the customer device. This is identical to step 106 shown in FIG. 1. The biometric monitoring may provide a first level reckoning of the likelihood of the customer entering the CSC.

Step 207 shows refining and/or tuning the determination of the likelihood of the customer entering the CSC. The refining and/or tuning is preferably based on a customer sentiment condition. An explanation of relevant customer sentiment condition information, as well as descriptions for deriving same, is set forth in U.S. patent application Ser. No. 16/840,706, entitled, "CUSTOMER-SENTIMENT DRIVEN WORKFLOW BASED ON SOCIAL MEDIA DATA", which was filed on Apr. 6, 2020, and is hereby incorporated by reference herein in its entirety.

It should be noted that in preferred embodiments, the refining and/or tuning the determination of the likelihood of the customer entering the CSC can continually or periodically be performed either prior to the customer entering the first level of proximity of the CSC, after the customer has entered the first level of proximity with respect to the CSC, but before the customer has entered a second level of proximity with respect to the CSC, or after the customer has entered the second level of proximity with respect to the CSC, or during more than one of the foregoing periods.

It should be noted that in preferred embodiments, the monitoring of the customer's biometric functions using the customer's device or using the independent tracking devices can continually or periodically be performed either prior to the customer entering the first level of proximity of the CSC, after the customer has entered the first level of proximity with respect to the CSC, but before the customer has entered a second level of proximity with respect to the CSC, or after the customer has entered the second level of proximity with respect to the CSC, or during more than one of the foregoing periods.

Step 209 shows that, when a likelihood of the customer entering the CSC traverses a first threshold value, then the process may provide to the CSC an indication of the likelihood that the customer is going to enter the CSC. It should be reiterated that the determination of the likelihood may be based on the biometric monitoring and/or refining and/or tuning described above.

Step 211 shows that, when there is a likelihood of the customer entering the CSC that is greater than a second threshold, then the process may electronically transmit instructions to the customer regarding his or her impending arrival at the CSC. At step 213, the process may also, when there is likelihood of the customer entering the CSC that is greater than the second threshold, communicate to the CSC that there is a high likelihood of the customer entering the CSC.

Figure 3:
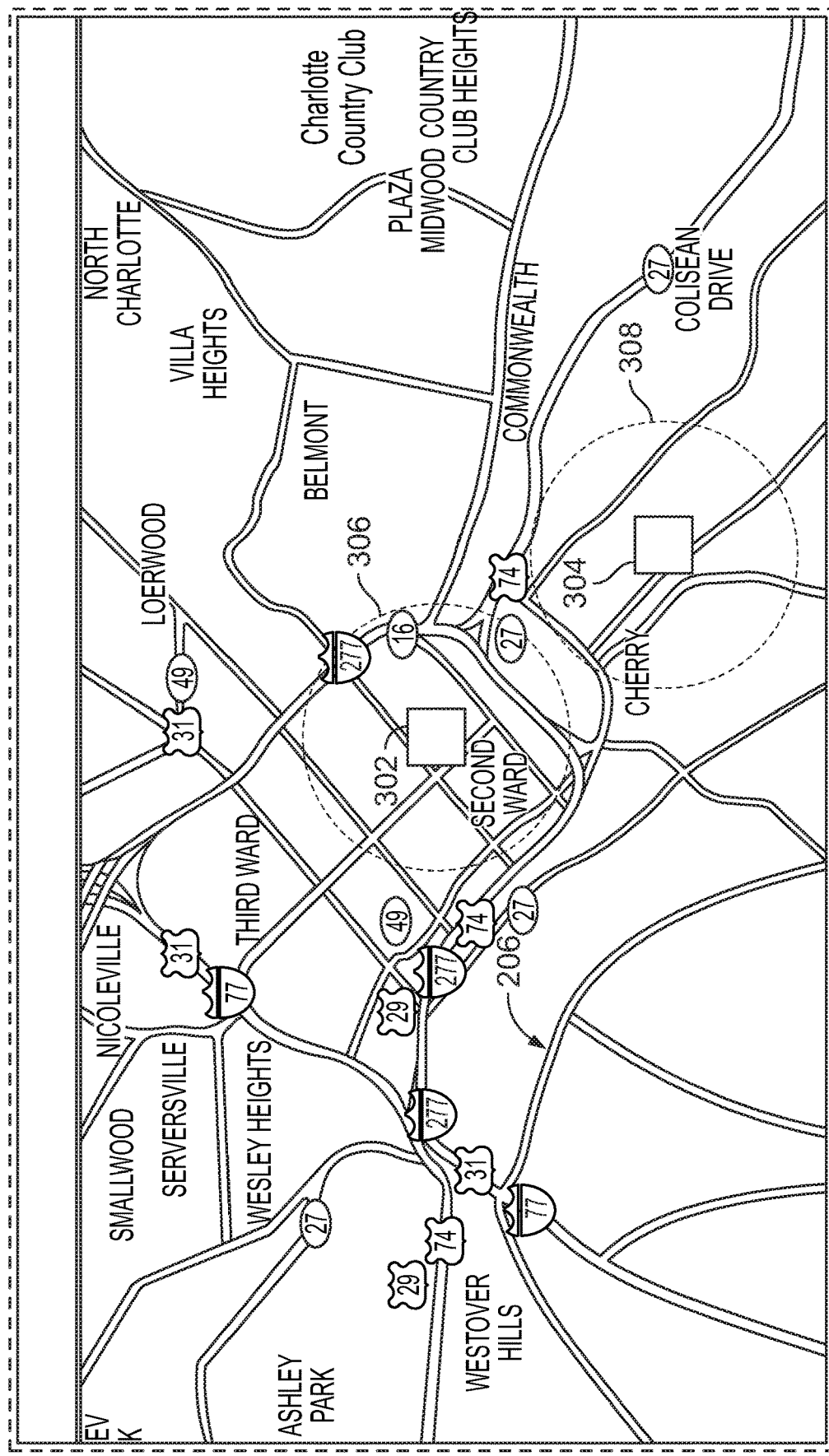
FIG. 3 shows an exemplary map for use with embodiments in accordance with principles of the disclosure.

FIG. 3 shows an exemplary map for use with embodiments in accordance with principles of the disclosure. The map in FIG. 3 shows two customer service centers (CSCs) 302, 304.

CSCs 302 and 304 are shown as surrounded by first proximity threshold areas 306 and 308, respectively.

Figure 4:
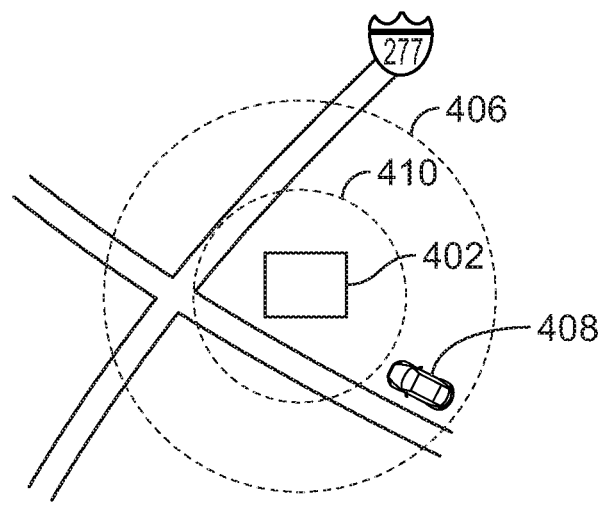
FIG. 4 shows a blown-up portion of the map shown in FIG. 3, in accordance with principles of the disclosure.

FIG. 4 shows a blown-up portion of the map shown in FIG. 3 in accordance with principles of the disclosure. A first customer support center is shown at 402.

A first proximity threshold area is shown at 406. A second proximity threshold area is shown at 410. A customer vehicle, with a customer device located therein is shown as having traversed the area bounded by the first proximity threshold area 406 but not the second proximity threshold area 410. In certain embodiments, such a customer location may trigger a set of independent tracking devices, typically located, for the most part, within first proximity threshold area 406 but not within second proximity threshold area 410 to further monitor the progress of customer vehicle 408, and determine the likelihood that the customer will enter CSC 402.

Such independent tracking devices may be located on utility poles, buildings or in other public places (not shown) in order to track the progress of customer vehicle 402. Tracking may preferably continue until the customer completes entry into the building 402. Building 402 represents a CSC.

In certain embodiments, the user location may be tracked by tracking a signal, such as a GPS signal, associated with the user device.

Figure 5:
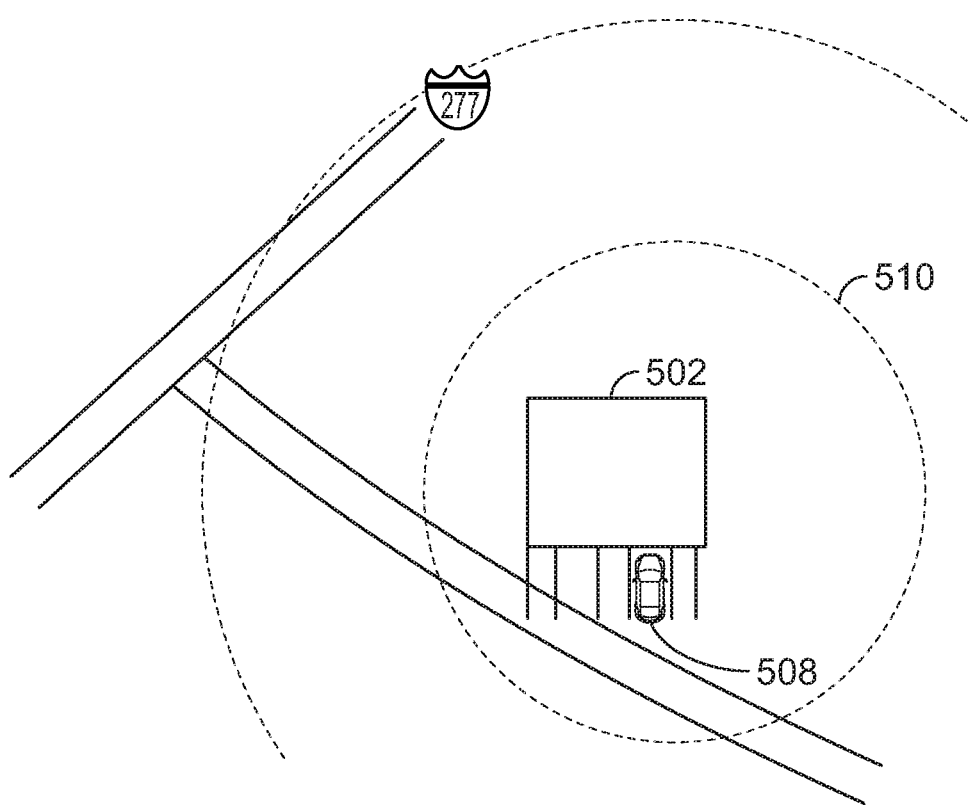
FIG. 5 shows a blown-up portion of the map shown in FIG. 4, in accordance with principles of the disclosure.

FIG. 5 shows a blown-up portion of the map shown in FIG. 4, in accordance with principles of the disclosure. In FIG. 5, customer 508 has entered the second level 510 of proximity with respect to the CSC 502.

Figure 6:
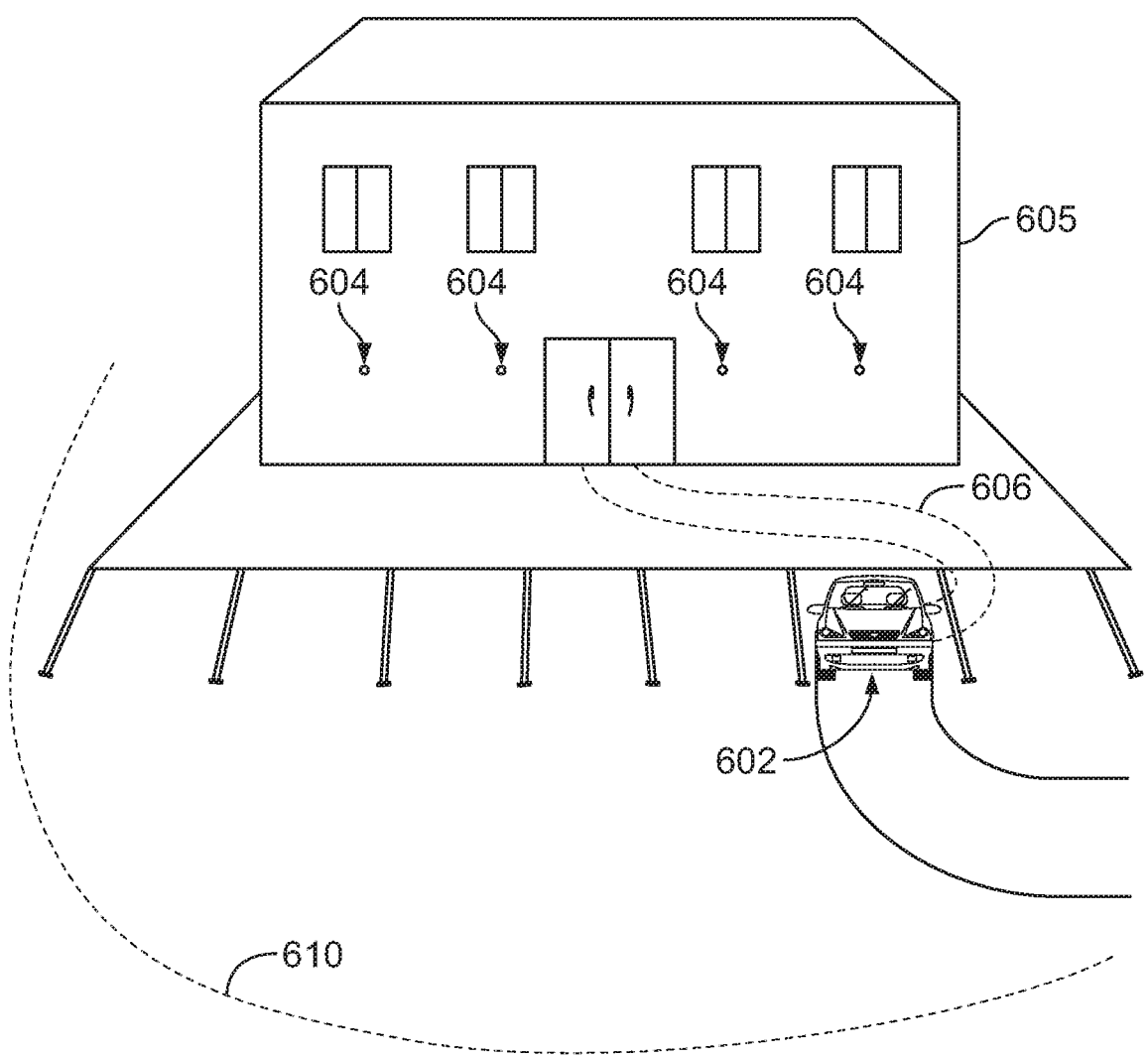
FIG. 6 shows an exemplary elevational viewpoint taken from the point of view of a customer approaching a customer support center.

FIG. 6 shows an exemplary elevational viewpoint taken from the point of view of a customer approaching a CSC 605. The customer vehicle 608 is shown approaching the CSC 605. At 606, the customer's physical approach to CSC 605 is indicated.

Sensors 604 represent sensors that may be activated to track customer 604 once the tracking of the customer is initiated. In the embodiment shown in FIG. 6, the tracking of the customer indicates that the customer has traversed second threshold 610.

Figure 7:
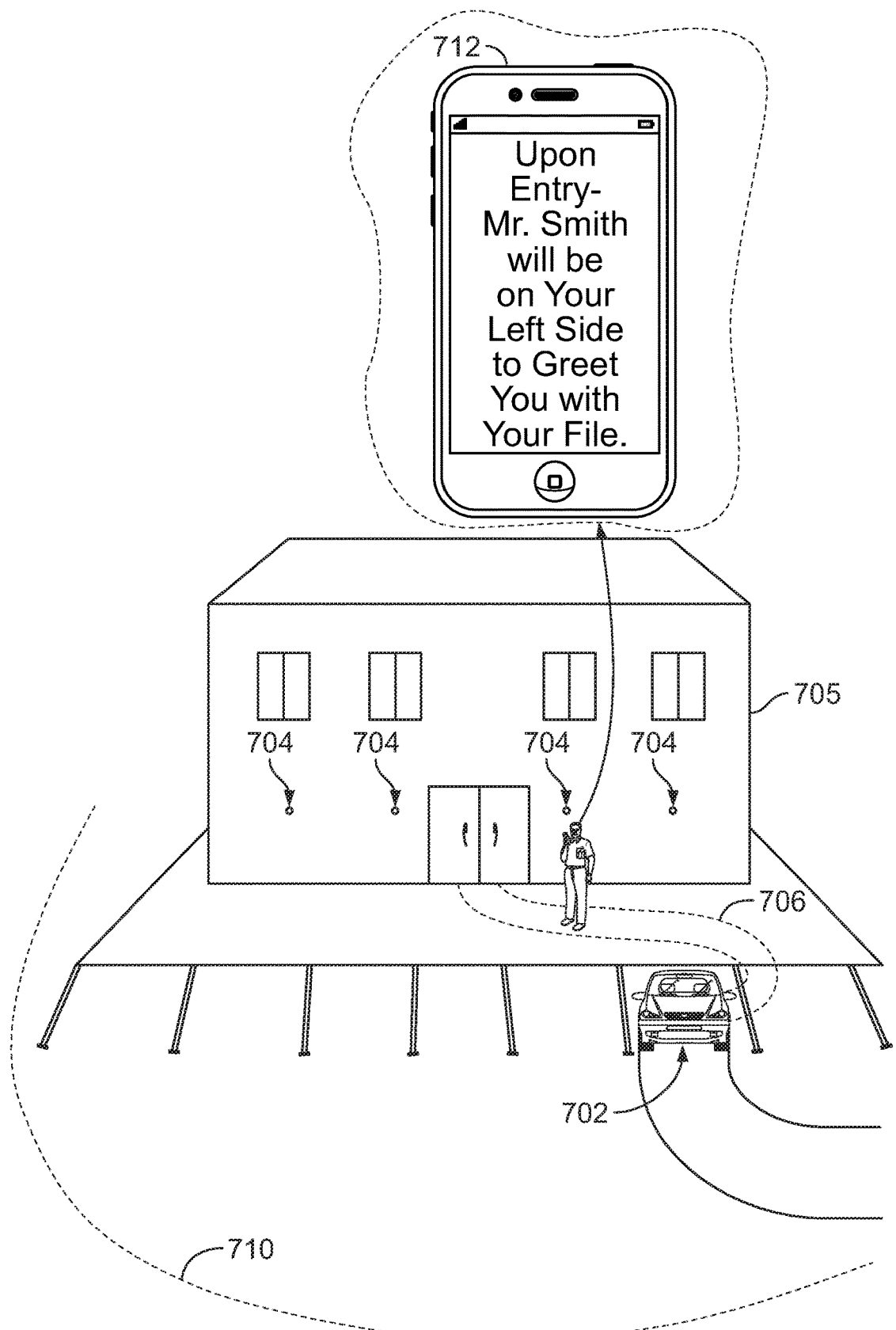
FIG. 7 shows an exemplary screenshot taken from a mobile device associated with a customer in accordance with the disclosure.

FIG. 7 shows an exemplary screenshot taken from a mobile device 712 associated with a customer in accordance with the disclosure. It should be noted that elements 602, 604, 605 and 610 are identical to elements 602, 604, 605 and 610 shown in FIG. 6.

Mobile device 712 also shows exemplary instructions for the customer that may be transmitted to the customer upon the customer's approach to the CSC 705. The screen shows that the customer has been transmitted instructions how to proceed upon entry into CSC 705.

FIG. 8 shows an exemplary screenshot taken from a device associated with a Customer Support Center (CSC) in accordance with the disclosure. Screen 802 shows that the CSC has been transmitted instructions regarding the imminent arrival of the customer. The instructions may be transmitted to, and/or specify whom, the customer should expect to meet upon his arrival at the CSC.

It should be noted that screen 802 also includes a note, at item (4), regarding Mr. Jones' predicted emotional state. It should be noted that the prediction of Mr. Jones' emotional state may include information derived from Mr. Jones' biometrics. Such derivation may preferably use either or both of Mr. Jones' mobile device and his unique history to determine his current emotional state. Specifically, and as described in more detail above, machine learning (ML) may also be used for evaluating the possibility of a pre-determined customer entering a customer support center (CSC), as well as the customer sentiment condition upon his or her predicted entry Thus, a customer sentiment-driven, multi-level, proximity responder is provided. Persons skilled in the art will appreciate that the present invention can be practiced by other than the described embodiments, which are presented for purposes of illustration rather than of limitation. The present invention is limited only by the claims that follow.

What is claimed is:

1. A method for determining a likelihood that a pre-determined customer will enter a selected customer support center building, the method comprising:
    determining whether the customer is within a predetermined distance of the customer support center building;
    when the customer is determined to be within the predetermined distance of the customer support center building, initiating:
        monitoring, using an electronic device within a predetermined proximity of the customer, a plurality of the customer's biometric functions to determine the likelihood of the customer entering the customer support center building; and
        tracking the customer inside a vehicle, using a set of independent tracking devices located on at least one of a utility pole or building, wherein the electronic device is located within the vehicle;
    tuning the determination of the likelihood of the customer entering the customer support center building by retrieving and reviewing a customer sentiment condition;
    providing to the customer support center building, when the tuned determination of the likelihood of the customer physically entering the customer support center building is higher than a first predetermined threshold level, the tuned determination of the likelihood of the customer physically entering the customer support center building; and
    electronically transmitting instructions to the electronic device when the tuned determination of the likelihood of the customer physically entering the customer support center building is higher than a second predetermined threshold level, said instructions that instructs the customer regarding a plurality of actions to take upon a projected entry into the customer support center building.

2. The method of claim 1 wherein the plurality of biometric functions comprises mouth movements and facial complexion.

3. The method of claim 1 wherein the plurality of biometric functions comprises heat detection, said heat detection identifying tension and/or level of calmness.

4. The method of claim 1 wherein the retrieving and reviewing the customer sentiment condition comprises retrieving and reviewing a plurality of historical customer sentiment profiles and comparing the customer sentiment condition thereto, and, based on the comparing, adjusting the instructions.

5. The method of claim 1 wherein the retrieving and reviewing the customer sentiment condition comprises retrieving and reviewing a plurality of artifacts from social media account history and/or other third party data source information associated with the device, and comparing the customer sentiment condition thereto, and, based on the comparing, adjusting the instructions.

6. The method of claim 1 wherein the providing to the customer support center building comprises forecasting the likely emotional, psychological and/or physical state of the customer upon entry to the customer center and adjusting the instructions based on the forecasting.

7. The method of claim 1 further comprising receiving a pre-registration from the device prior to retrieving and reviewing the customer sentiment condition.

8. The method of claim 7, wherein the receiving a pre-registration from the device comprising receiving an opt-in for customer tracking from the customer.

9. A method for determining a likelihood that a pre-determined customer will enter a selected customer support center building, the method comprising:
- determining whether the customer is within a predetermined distance of the customer support center building;
- when the customer is determined to be within the predetermined distance of the customer support center building, initiating:
  - monitoring of a customer location, using an electronic device within a pre-determined proximity of the customer, to determine the likelihood of the customer entering the customer support center building; and
  - tracking, using a set of independent tracking devices located on at least one of a utility pole or building, the customer inside a vehicle, wherein the electronic device is located within the vehicle;
- tuning the determination of the likelihood of the customer entering the customer support center building by retrieving and reviewing a customer sentiment condition, the retrieving and revising a customer sentiment condition comprising retrieving and reviewing using the customer device, a plurality of the customer's biometric functions;
- providing to the customer support center building, when the tuned determination of the likelihood of the customer physically entering the customer support center building is higher than a first predetermined threshold level, the tuned determination of the likelihood of the customer physically entering the customer support center building; and
- electronically transmitting instructions to the electronic device when the tuned determination of the likelihood of the customer physically entering the customer support center building is higher than a second predetermined threshold level, said instructions that instructs the customer regarding a plurality of actions to take upon a projected entry into the customer support center building.

10. The method of claim 9 wherein the plurality of biometric functions comprises mouth movements and facial complexion.

11. The method of claim 9 wherein the plurality of biometric functions comprises heat detection, said heat detection identifying tension and/or level of calmness.

12. The method of claim 9 wherein the retrieving and reviewing the customer sentiment condition comprises retrieving and reviewing a plurality of historical customer sentiment profiles and comparing the customer sentiment condition thereto, and, based on the comparing, adjusting the instructions.

* * * * *